United States Patent Office 2,713,762
Patented July 26, 1955

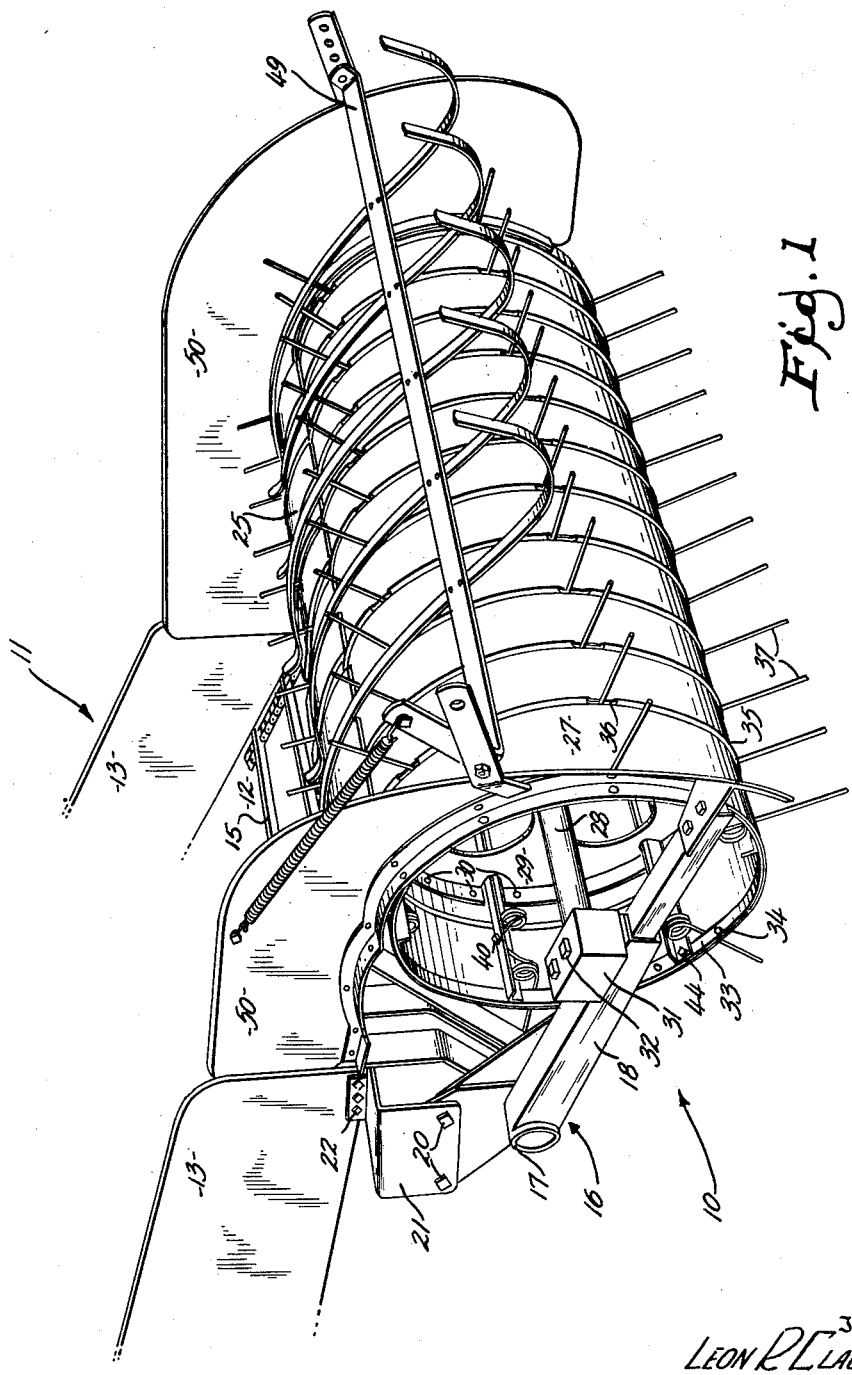

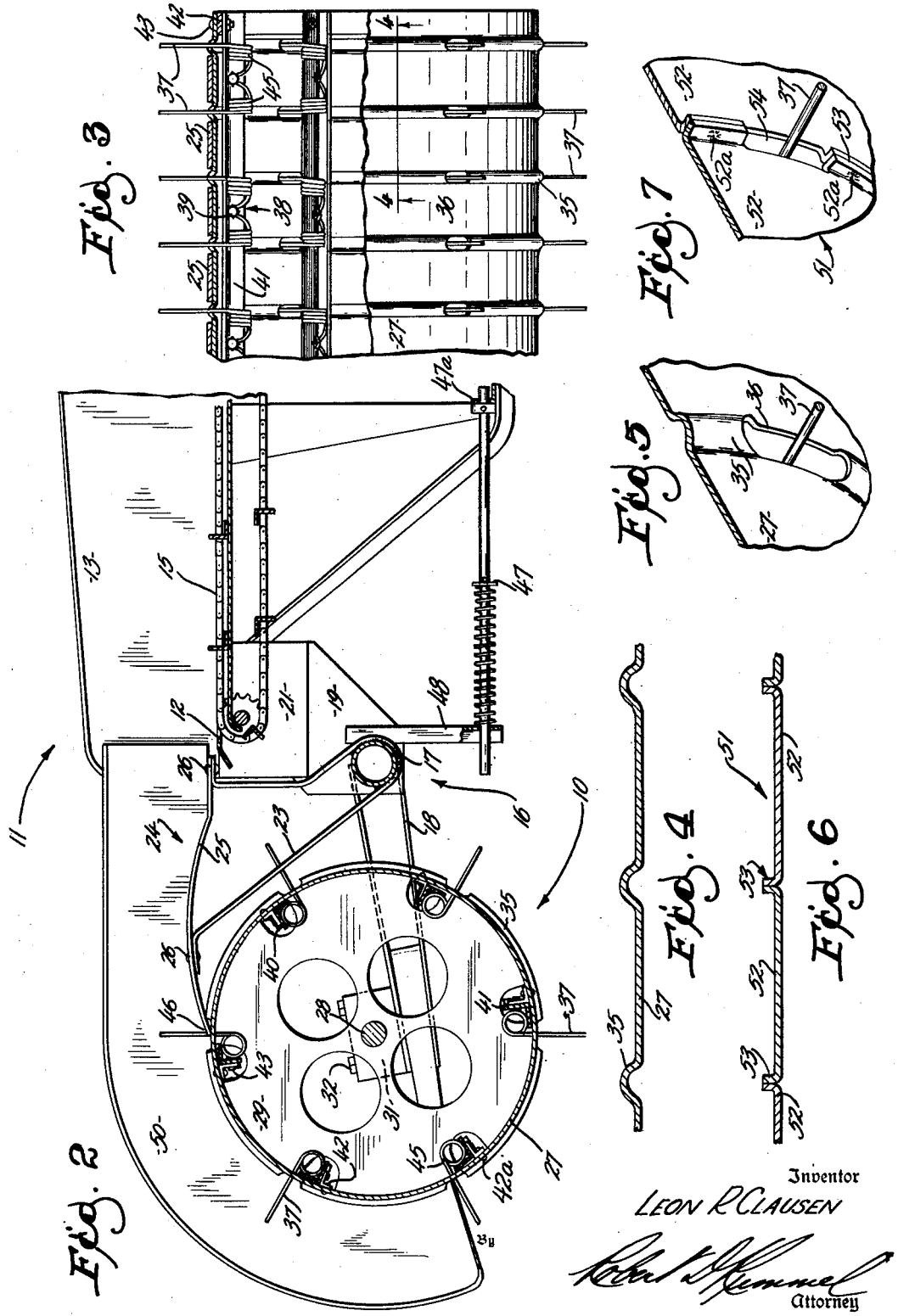

2,713,762
PICKUP DRUM

Leon R. Clausen, Racine, Wis., assignor to J. I. Case Company, Racine, Wis., a corporation of Wisconsin Application May 31, 1951, Serial No. 229,217

8 Claims. (Cl. 56—364)

The present invention relates to a pickup drum and an object of the invention is to generally improve the construction and operation of the devices of this class.

A further object of this invention is to provide a pickup drum of a type directly exposed to crop material which supports the apron of crop material picked up by the drum in an elevated position with respect to the drum so that the tendency of crop material to wedge between the drum and the usual stripping plate is alleviated.

Other objects and advantages of the invention will be apparent from the following specification and accompanying drawings in which:

Fig. 1 is a perspective view of a pickup member and receiving mechanism, with parts removed;

Fig. 2 is an elevational view with parts broken away and shown in section of the left side of the device shown in Fig. 1;

Fig. 3 is a front elevational view of a portion of the pickup member shown in Fig. 1, with parts broken away and shown in section to show the interior construction;

Fig. 4 is a vertical sectional view taken on the line 4—4 of Fig. 3, slightly enlarged, showing the construction of the pickup drum;

Fig. 5 is an enlarged fragmentary perspective view with parts broken away and shown in section of a portion of the drum in Figure 1;

Fig. 6 is a view similar to Fig. 4, showing a modification; and

Fig. 7 is a view similar to Fig. 5 showing the modification of Fig. 6.

As seen in Figs. 1 and 2, a pickup member embodying the present invention, designated generally as 10, is shown as applied to a receiving mechanism 11 of the type generally found in forage harvesters, balers, and similar type machines, wherein the crop is picked up by the pickup member and deposited upon the receiving mechanism for transmission to the operating mechanisms of the forage harvester, baler, or other similar machine, no part of these machines being shown since they form no part of the present invention.

The receiving mechanism 11 can be of any well-known or suitable construction and since it includes no part of the present invention, it is defined only in general terms. The receiving mechanism is preferably formed of sheet metal and includes a receiving platform 12 which has upwardly extending sides 13 for defining the width of the apron of crop material deposited upon the platform 12. A suitable conveyor 15, only partly shown, is carried on platform 12 and is so positioned thereon as to carry crop material deposited upon the platform rearwardly into the operating mechanism of the attaching implement, as previously suggested.

The pickup member 10 is carried forwardly of platform 12 on a bail, generally designated as 16, constituting part of the above-mentioned receiving mechanism 11. The bail 16 of any well-known or suitable construction includes in the present instance a tubular member 17 and a pair of supporting arms 18, only one of which is visible, which are welded to opposite ends of tubular member 17. The tubular member 17 is rotatably supported in brackets 19 which are secured as by bolts or the like 20 to depending brackets 21 which are secured to platform 12 on opposite sides thereof, as by bolts or the like 22, only one of the brackets 19 and depending brackets 21 being visible in the drawings. A series of equally spaced hangers 23 are secured to the tubular member 17, as by welding or the like, and carry spaced above member 17, a slotted stripper plate designated generally as 24, but actually comprising in the present instance a series of spaced-apart plates 25 which are so curved and spaced from one another as to support the material picked up by the drum upon movement of the material rearwardly so that the same will be deposited upon platform 12. Each plate 25 is secured to an individual hanger 23 by means of rivets or the like 26, and the stripper plate 24 terminates rearwardly so as to slightly overlap the forward or leading surface of the platform 12 during operation.

The pickup member 10 comprises a cylindrical sheet-metal drum 27 which encircles a shaft 28. The drum is held in driving and substantially co-axial relationship with shaft 28 by means of flanged radial disks 29, only one of which is visible in the drawings, the disks 29 being secured to the inner circumference of the drum 27 by means of flat-headed bolts or the like 30 and to the outer circumference of shaft 28 by means of welding or any other suitable means. The shaft 28 extends laterally from opposite ends of drum 27 and is rotatably supported in suitable bearings 31, only one of which is visible, which are secured to above-mentioned supporting arms 18 adjacent the forward end thereof by means of bolts or the like 32. Spaced rings 33, only one of which is visible, are secured to the inner circumference of drum 27 adjacent the opposite ends thereof by means of suitable flat-headed bolts or the like 34 for reinforcing the drum as well known in the art.

The drum 27 is formed with a plurality of equally spaced peripheral beads 35, preferably formed in the sheet metal prior to its being rolled into a cylindrical drum, each bead lying in a plane substantially normal to the axis of shaft 28. Equally spaced openings 36 are formed in the beads 35 and the openings formed in any one bead lie in substantially the same radial plane as the openings formed in the remaining beads. Pickup fingers 37 project through the openings 36, the fingers being formed in the present instance in pairs from a single piece of resilient wire or the like 38, see Fig. 3, each wire 38 being engaged beneath a nut 39 of a bolt or the like 40. The bolts 40 are secured in spaced relationship to suitable pickup-finger supporting members 41, which in the present instance are preferably formed of angle irons. The members 41 are angularly spaced about the axis of shaft 28 around the inside circumference of drum 27 and secured thereto by means of suitable tabs 42 which are fixed to the drum by rivets 42a and secured to the angle irons by means of suitable bolts 43. Adjacent the opposite ends thereof, the angle irons are secured to the rings 33 by means of suitable bolts or the like 44. The angle irons 41 are so spaced around the inside circumference of drum 27 that a finger 37 projects through each of the openings 36. The fingers 37 in the present instance project sustantially radially through the openings 36 although other positions for the fingers may be desirable under certain conditions. The wires 38 on opposite sides of the nuts 39 are coiled, as designated at 45, thus providing for yielding of the fingers by flexing the coils, and the openings 36 are made sufficiently long to provide for freedom of movement of the fingers in either direction peripherally of the drum. In this manner the impact of the fingers with the ends of the openings upon release of the fingers from the material being picked up is prevented, which avoids shock loads and fatigue in the metal of the fingers. The pickup member 10 is rotated in clockwise direction, as seen in Fig. 2, by any suitable or conventional driving means, not shown and forming no part of the present invention, as the machine carrying the receiving mechanism is advanced to the left, as well known in the art. The drum 27 is positioned on the arms 18 so as to approach the forward extremity of the stripper plate 24 at about the point 46, and the number of plates 25 corresponds to the number of recessed portions formed between adjacent beads 35 so that an individual plate 25 operates in each recessed area formed between every two adjacent beads. The stripping plates 25 are so curved as to be in stripping relationship with the fingers at substantially all points during the passage of the fingers between the space provided between adjacent plates 25, the plates approaching the drum closely at point 46 and gradually rising therefrom in the direction of movement of the fingers so that upon disappearance of the fingers beneath the plates 25, the crop material will be stripped clearly therefrom as well known in the art. This position of the plates 25 gently urges the crop material rearwardly along the length of the fingers toward and off the ends thereof so that there is no tendency towards catching or packing any material between the plates and the fingers, the material upon being stripped from the fingers being deposited upon platform 12 and carried rearward by means of conveyor 15, as previously suggested.

The apron of crop material picked up by the fingers 37 and lifted upwardly and rearwardly towards the stripper plate 24 is supported upon contact with the drum by the beads 35 in an elevated position with respect to the periphery of the recessed areas formed between the beads before it is urged rearwardly upon the slotted stripper plate 24. It will be appreciated that while it is desirable that the stripper plate be positioned with respect to the drum so as to closely approach the drum as at 46, frictional contact between the stripper plate and the rotating drum is undesirable because of the resulting friction created between the contacting surfaces and the danger of emitted sparks. It has been found in the operation of a pickup device of conventional construction wherein the drum is substantially smooth circumferentially, that the apron of crop material picked up by the finger has a tendency of being wedged between the stripping plate and the drum, this wedged material tending to accumulate until sufficient material is tangled between the stripping plate and the drum to interfere with the stripping action.

In the present construction, the apron of crop material is carried in a sufficiently elevated position on the beads 35 to substantially clear the forward end of the stripper plate 24 greatly alleviating thereby the tendency for crop material to be welged between the drum and the plates 25. It has been found that the best results are obtained by choosing a bead which extends radially from the drum a distance slightly greater than the thickness of the stripping plate.

The pickup drum 27 and the supporting bail 16 are counter-balanced in any suitable manner well known in the art by means of a spring and rod assembly 47 which extends forwardly from some convenient point on the receiving mechanism 11, such as designated at 47a, to a downwardly depending lever arm or yoke member 48 which is rigidly fixed to the pivoted tubular shaft 17. The spring tension is adjusted so that the bail 16 is maintained in a substantially fixed relation in the brackets 19 with the fingers 37 barely in contact with the ground but is sufficiently resilient for the drum to move upward if the fingers strike any irregularity in the field.

Suitable hold-down strips 49 are provided for resiliently holding the picked up crop material in contact with the stripper plate 24 and drum 27, and suitable flared end sections 50 further guide and direct the crop material which is picked up by the fingers 37. These elements can be of any suitable or well-known construction and form no part of the present invention.

A modified form of the invention is shown in Figs. 6 and 7 wherein a drum 51, only a portion of which is shown, is formed of flanged sheet-metal rings 52 welded at 52a or otherwise suitably secured end to end, the flanges of each ring forming with the flanges of its adjacent rings beads 53. Openings 54, corresponding to the openings 36, are formed in the beads 53 and the fingers 37 project through the openings in the same manner as previously described, the openings 54 being sufficiently long to provide for freedom of movement of the fingers in either direction. The rings 52 are formed of a size sufficient to accommodate a plate 25 of stripper 24 between adjacent beads 53 so that when drum 51 is supported in stripping relationship with respect to stripper plate 24, by means of suitable construction already described and shown with respect to drum 27, beads 53 will function in the same manner as beads 35.

Having thus described my invention, what I claim as new and desire to secure by Letters Patent of the United States is:

1. In a pickup unit for an agricultural implement, a stripping means, a cylindrical drum rotatably supported in stripping relationship with respect to said stripping means, said drum having formed thereon spaced circumferential continuous raised beads, said stripping means having stripper plates passing between said beads and terminating adjacent the periphery of said drum between said beads, said beads having circumferentially spaced openings formed therein, and pickup fingers extending through said openings and positioned substantially in the radial medial plane of their respective bead and in stripping relationship with respect to said stripping means whereby the material picked up by the fingers will be stripped therefrom, said stripper plates being greater in width than the width of said beads and said beads supporting an apron of material in a sufficiently elevated position with respect to the peripheral surface of said drum between said beads to clear the forward ends of said stripper plates.

2. In a pickup unit for an agricultural implement, a stripping means having a series of equally spaced stripper plates, a cylindrical drum rotatably supported so as to be in stripping relationship with respect to said stripper plates, said cylindrical drum being formed of sheet metal and having equally spaced circumferential continuous raised beads formed thereon, each of said beads being accommodated in the space provided between adjacent stripper plates and each of said stripper plates being greater in width than its adjacent bead, whereby the stripper plates work in the recessed areas formed between the adjacent beads, said beads having, formed therein, openings, and pickup fingers extending through said openings and located substantially in the medial radial plane of their respective bead and traveling through the space between adjacent stripper plates so that the material picked up by the fingers will be stripped therefrom, said beads supporting an apron of material picked up by said fingers in a sufficiently elevated position with respect to the periphery of said drum between said beads to clear the forward ends of said stripper plates.

3. In a pickup unit for an agricultural implement, a stripping means, a cylindrical drum rotatably supported in stripping relationship with respect to said stripping means, said cylindrical drum being formed of flanged rings, the flanges of one ring being fixed to a flange of each of its adjacent rings, the flanges of adjacent rings forming equally spaced raised beads extending circumferentially around said drum, said stripping means having stripper plates passing between the respective beads and terminating adjacent the periphery of said drum between said beads, said stripper plates being greater in width than the width of said beads and said beads having openings formed therein, and pickup fingers extending through said openings and positioned substantially in the medial radial plane of their respective bead and in stripping relationship with respect to said stripper plates so that material picked up by the fingers will be stripped therefrom, said beads supporting an apron of material in a sufficiently elevated position with respect to the circumferential surface of said drum between said beads to clear the forward ends of said stripper plates.

4. In a pickup unit for an agricultural implement, a stripping means, a cylindrical drum rotatably supported so as to be in stripping relationship with respect to said stripping means, said cylindrical drum being formed of flanged rings welded together end to end so that the axis of one ring is substantially co-axial with respect to the axis of the remaining rings, the flanges of adjacent rings forming spaced raised beads extending circumferentially around said drum, said stripping means comprising a plurality of spaced stripper plates and each of said beads being accommodated between adjacent stripper plates, said stripper plates passing between adjacent beads and terminating adjacent the periphery of said drum between said beads, said stripper plates being greater in width than the width of said beads and said beads having formed therein circumferentially spaced openings, and pickup fingers extending through said openings and positioned substantially in the medial radial plane of their respective bead and traveling through the space between adjacent stripper plates so that the material picked up by the fingers is stripped therefrom by the stripper plates, said beads supporting an apron of material in a sufficiently elevated position with respect to the peripheral surface of said drum between said beads to clear the forward ends of said stripper plates.

5. In a pickup unit for an agricultural implement, a rotatable drum supported in position to directly contact material to be picked up, said drum having spaced circumferential crop supporting substantially continuous raised portions, and stripping means supported adjacent the drum and having stripper plates projecting toward the drum in a direction generally opposite to the direction of movement of the surface of the drum resulting from the normal rotation thereof and terminating between said raised portions substantially in sliding contact with the surface of the drum between said raised portions, said stripper plates being greater in width than the width of the individual raised portions of said drum, and said raised portions supporting the crop in a sufficiently elevated position with respect to the circumferential surface of said drum to clear the forward ends of said stripper plates.

6. In a pickup unit for an agricultural implement a rotatable drum supported in position to directly contact material to be picked up, said drum having spaced circumferential crop supporting substantially continuous raised portions, and stripping means supported adjacent the drum and having stripper plates projecting toward the drum in a direction generally opposite to the direction of movement of the surface of the drum resulting from the normal rotation thereof and terminating between said raised portions closer to the surface of said drum than the tops of said raised portions, said stripper plates being greater in width than the width of the individual raised portions of said drum, and said raised portions supporting the crop in a sufficiently elevated position with respect to the circumferential surface of said drum to clear the forward ends of said stripper plates.

7. In a pickup unit for an agricultural implement, a rotatable drum supported in position to directly contact material to be picked up, said drum having spaced circumferential crop supporting substantially continuous raised portions, stripping means supported adjacent the drum and having stripper plates projecting toward the drum in a direction generally opposite to the movement of the surface of the drum resulting from the normal rotation thereof and terminating between said raised portions substantially in sliding contact with the surface of the drum between said raised portions, and a plurality of pickup fingers projecting from each of the raised portions of the drum and positioned substantially in the medial radial plane of their respective raised portions so as to pass between the projecting stripper plates of the stripping means, said stripper plates being greater in width than the width of the individual raised portions of said drum, and said raised portions supporting the crop in a sufficiently elevated position with respect to the circumferential surface of said drum to clear the forward ends of said stripper plates.

8. In a pickup unit for an agricultural implement, a rotatable drum supported in position to directly contact material to be picked up, said drum having spaced circumferential crop supporting substantially continuous raised portions, stripping means supported adjacent the drum and having stripper plates projecting toward the drum in a direction generally opposite to the movement of the surface of the drum resulting from the normal rotation thereof and terminating between said raised portions closer to the surface of said drum than the tops of said raised portions, and a plurality of pickup fingers projecting from each of the raised portions of the drum and positioned substantially in the medial radial plane of their respective raised portions so as to pass between the stripper plates of the stripping means, said stripper plates being greater in width than the width of the individual raised portions of said drum, and said raised portions supporting the crop in a sufficiently elevated position with respect to the circumferential surface of said drum to clear the forward ends of said stripper plates.

References Cited in the file of this patent

UNITED STATES PATENTS

| 2,233,837 | Fuhrhop | Mar. 4, 1941 |
| 2,324,261 | Krause | July 13, 1943 |